United States Patent
Freeman

(10) Patent No.: US 6,264,904 B1
(45) Date of Patent: Jul. 24, 2001

(54) PROCESS FOR RECOVERY OF COBALT BY SELECTIVE PRECIPITATION OF COBALT-CALCIUM DOUBLE SALT

(75) Inventor: Gavin Kerry Wyllie Freeman, Alberta (CA)

(73) Assignee: Sherritt International Corporation, Fort Saskatchewan (CA)

(*) Notice: Subject to any disclaimer, the term of this patent is extended or adjusted under 35 U.S.C. 154(b) by 0 days.

(21) Appl. No.: 09/547,021

(22) Filed: Apr. 11, 2000

(51) Int. Cl.[7] .................... C22B 23/00; C22B 26/20; C01F 1/00; C01F 11/18
(52) U.S. Cl. .................... 423/145; 423/141; 423/150.1; 423/150.5; 423/165
(58) Field of Search .................... 423/145, 165, 423/150.1, 150.5, 141

(56) References Cited

U.S. PATENT DOCUMENTS

| | | |
|---|---|---|
| 2,412,890 | 12/1946 | Jones et al. . |
| 2,576,314 | 11/1951 | Forward . |
| 2,647,819 | 8/1953 | McGauley . |
| 2,694,005 | 11/1954 | Schaufelberger . |
| 2,694,006 | 11/1954 | Schaufelberger . |
| 2,716,591 | 8/1955 | Thomsen . |
| 2,728,636 | 12/1955 | Van Hare, Jr. et al. . |
| 2,767,054 | 10/1956 | Schaufelberger . |
| 2,767,055 | 10/1956 | Schaufelberger . |
| 2,822,264 | 2/1958 | Sherritt . |
| 3,227,513 | 1/1966 | Alexa et al. . |
| 3,493,365 | 2/1970 | Pickering et al. . |
| 3,933,975 | * 1/1976 | Nikolic et al. .................... 423/145 |
| 3,967,957 | 7/1976 | Fonseca . |
| 4,024,218 | 5/1977 | McKay et al. . |
| 4,067,952 | 1/1978 | Pittie et al. . |
| 4,108,640 | 8/1978 | Wallace et al. . |
| 4,118,221 | 10/1978 | Ettel et al. . |
| 4,208,380 | 6/1980 | Hamalainen et al. . |
| 4,280,988 | 7/1981 | Subramanian et al. . |
| 4,600,435 | 7/1986 | Wiegers et al. . |
| 5,332,560 | 7/1994 | Kruesi et al. . |
| 5,468,281 | 11/1995 | Kerfoot et al. . |
| 5,599,514 | 2/1997 | Gardano et al. . |

FOREIGN PATENT DOCUMENTS

75/00026   1/1976 (ZA) .

OTHER PUBLICATIONS

"The Winning of Nickel", J.R. Boldt, Jr. (Ed), Toronto, Longmans, Canada Limited, 1967, No month, pp. 299–314.

* cited by examiner

Primary Examiner—Steven Bos
(74) Attorney, Agent, or Firm—Arne I. Fors

(57) ABSTRACT

There is provided a process for the recovery of cobalt as cobalt (III) hexammine sulphate, comprising adding an effective amount of a calcium sulphate slurry to an ammoniacal ammonium sulphate solution containing cobalt (III) hexammine sulphate to thereby selectively precipitate a cobalt (III) hexammine sulphate-calcium sulphate double salt. The solution containing other base metal impurities is separated from the cobalt (III) hexammine sulphate-calcium sulphate double salt precipitate. An effective amount of an ammonium carbonate containing solution is added to the double salt precipitate to thereby redissolve cobalt (III) hexammine sulphate and precipitate calcium carbonate.

20 Claims, 1 Drawing Sheet

PROCESS FOR RECOVERY OF COBALT BY SELECTIVE PRECIPITATION OF COBALT-CALCIUM DOUBLE SALT

FIELD OF THE INVENTION

The invention relates to a process for the recovery of cobalt from an ammoniacal ammonium sulphate solution containing cobalt and other metal values to produce a substantially pure cobalt solution from which high purity cobalt metal may be obtained and most particularly, to the precipitation from an ammoniacal ammonium sulphate leach solution of a cobalt (III) hexammine sulphate-calcium sulphate double salt.

BACKGROUND OF THE INVENTION

A hydrometallurgical process for the treatment of nickel-cobalt-copper sulphide concentrates and mattes to produce high grade nickel and cobalt powders has been in commercial operation for many years. In this process, which is described in the publication, "The Winning of Nickel", J. R. Boldt, Jr. (Ed), Toronto, Longmans, Canada Limited, 1967, pages 299 to 314, the nickel sulphide feed materials are leached in ammoniacal ammonium sulphate solution, under elevated air pressure, in horizontal autoclaves. The metals, nickel, cobalt and copper are dissolved as metal ammine complex ions. Iron is oxidized to insoluble haematite, and sulphide sulphur is partially oxidized to form a range of unsaturated sulphur anions which remain in the leach solution. The haematite residue is filtered off, washed and discarded, and the leach solution is treated to remove copper, to partially remove the ammonia, and to oxidize the sulphur anions to sulphate. The purified solution, which contains about 60 g/L, Ni and 1 g/L Co, is then treated with hydrogen under elevated pressure and temperature to precipitate nickel selectively as the metal powder. The cobalt remains in the reduced solution which contains about 1 g/L Ni and 1 g/L Co. The residual metals are then precipitated using hydrogen sulphide to produce a mixed nickel cobalt sulphide which forms the feed to the cobalt refining process.

The recovery of cobalt, in this nickel refining process, is much lower than that of nickel, as a result of the adsorption of cobalt, by the iron oxide leach residue. Furthermore, the selectivity of the reduction process, for nickel, depends on the maintenance of a low level of cobalt in the purified leach solution. It is only possible to produce nickel powder meeting the market specifications for cobalt, if the Ni:Co ratio is maintained above about 20:1. It will be appreciated, therefore, that this nickel refining process is not economically effective for the treatment of nickel feed materials with high cobalt content, since significant losses of cobalt to the leach residue and to the nickel powder product will be incurred.

An earlier commercial cobalt refining process based on the soluble cobaltic pentammine process for separating nickel from cobalt, had been operated in conjunction with the above nickel refining process. This process was based on U.S. Pat. Nos. 2,694,005; 2,694,006; 2,767,054 and 2,767,055 to Schaufelburger.

When limonitic nickel laterite ores are treated by high temperature sulphuric acid pressure leaching, the dissolved nickel and cobalt are both recovered in high yields as a mixed sulphide typically containing about 55% Ni and 5% Co, i.e. with a Ni:Co ratio of about 10:1. This process is expected to become increasingly important economically in the future as the nickel mining industry switches to the treatment of laterite ores, as economically viable sulphide ore reserves are depleted. Material of this composition cannot be treated economically by the existing hydrometallurgical processes described supra.

Several methods of refining mixed nickel-cobalt sulphides of this type have been proposed in recent years, although none is known to have been commercialized successfully. A process described in Chemical Engineering, Sep. 7, 1959, page 145, included an acidic pressure leach to oxidize nickel and cobalt sulphides to the corresponding sulphates, solution purification to remove iron, aluminium, copper, lead and zinc, and selective reduction of nickel with hydrogen. However, since the cobalt content of the solution fed to the nickel reduction operation was about 5 g/L, excessive contamination of the nickel powder with cobalt was unavoidable, and the nickel powder would not meet current market cobalt specifications. However, during recent years hydrometallurgical processes dependant upon acidic pressure leaching techniques have been using solvent extraction to effect cobalt-nickel separation.

A number of methods proposed for the separation of cobalt from nickel have been based on the differential solubilities of the ammine complexes of nickel (II) and cobalt (III). Such methods have been proposed, for example, in U.S. Pat. No 2,728,636 to Van Hare; U.S. Pat. No. 3,227,513, to Alexa et al.; U.S. Pat. No. 3,967,957, to Fonseca and U.S. Pat. No. 4,208,380 to Hamalainen.

Prior art processes for the separate recovery of nickel and cobalt from sulphuric acid leach liquors are exemplified by South African Patent No. 75 00026. This patent describes a process in which a minor portion of the feed solution containing nickel and cobalt is neutralized with ammonium hydroxide to precipitate nickel (II) hydroxide, which is then oxidized to Ni (III) hydroxide, using a strong oxidant, such as a hypochlorite or a persulphate. This nickel (III) hydroxide is then used as a reagent to precipitate cobalt (III) hydroxide selectively from the major portion of the feed solution, to produce a nickel solution depleted in cobalt. The precipitate, which is a mixture of nickel (II) and cobalt (III) hydroxides, is further treated by redissolution in ammoniacal ammonium sulphate to form a solution containing nickel (II) and cobalt (III) pentammine sulphates, from which nickel is selectively precipitated as crystalline nickel ammonium sulphate, by acidifying the solution with sulphuric acid. The final traces of nickel are removed from the purified solution by ion exchange.

Kerfoot, in U.S. Pat. No. 5,468,281, broadly teaches a process for producing cobalt powder from nickel-cobalt sulphides which involves precipitating the triple salt of cobalt (III) hexammine sulphate, nickel (II) hexammine sulphate and ammonium sulphate. More specifically, the nickel-cobalt sulphides are pressure leached under oxidizing conditions in an ammoniacal ammonium sulphate solution at a temperature of at least 80° C. at an effective ammonia to metals molar ratio ranging between 5:1 to 6.5:1 to oxidize the nickel and cobalt sulphides to sulphate thereby producing an ammoniacal leach liquor in which dissolved cobalt is predominantly in the (III) oxidation state, and a leach residue. The leach liquor is separated from the leach residue which is washed and discarded. The leach liquor is then saturated with an effective amount of anhydrous ammonia and cooled to below 50° C. to thereby precipitate the triple salt comprising cobalt (III) hexammine sulphate, nickel (II) hexammine sulphate and ammonium sulphate. The cobalt-depleted leach liquor is passed to a nickel recovery circuit. The precipitated triple salt is recovered from the leach liquor and repulped with water to selectively leach nickel (II) hexammine sulphate and to produce a crystalline cobaltic (III) hexammine sulphate having a Co:Ni ratio of at least 100:1 and a nickel enriched leach liquor. The cobaltic (III) hexammine sulphate is recovered, dissolved in ammonium sulphate solution and ammoniated to precipitate recrystallized cobaltic (III) hexammine sulphate having a Co:Ni ratio of at least 1000:1, which is subsequently treated to produce cobalt powder therefrom.

Deleteriously, however, using the process of the '281 patent to separate cobalt from an ammoniacal ammonium sulphate leach liquor results in a significant dilution of the nickel-rich solution thereby reducing the productivity of the subsequent nickel metal process steps. A further economic disadvantage to this process is that it produces a nickel solution containing an elevated level of free ammonia which must be removed by distillation before nickel can be recovered using conventional processes.

SUMMARY OF THE INVENTION

It is a primary objective of the present invention to provide a hydrometallurgical process having enhanced cobalt recovery wherein the process involves the selective precipitation of the cobalt from an ammoniacal metal-containing leach liquor solution It is a more specific objective of the present invention to provide a hydrometallurgical process having enhanced cobalt recovery wherein the process involves the selective precipitation of the cobalt from an ammoniacal nickel-cobalt sulphide leach liquor solution.

The present improvement is founded on the discovery that, without being bound by same, the insoluble, cobalt (III) hexammine sulphate-calcium sulphate double salt is precipitated upon addition of a calcium sulphate-containing slurry to the ammoniacal ammonium sulphate leach solution produced by the pressure leaching under oxidizing conditions of metal-containing sulphidic material. The precipitated cobalt (III) hexammine sulphate-calcium sulphate double salt is then reacted with an ammonium carbonate solution to redissolve the cobalt (III) hexammine sulphate and precipitate calcium carbonate in accordance with the following reaction:

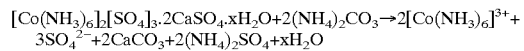
$$[Co(NH_3)_6]_2[SO_4]_3 \cdot 2CaSO_4 \cdot xH_2O + 2(NH_4)_2CO_3 \rightarrow 2[Co(NH_3)_6]^{3+} + 3SO_4^{2-} + 2CaCO_3 + 2(NH_4)_2SO_4 + xH_2O$$

wherein X is 2, 4 or 6.

Thus, in utilizing the instant process, the drawbacks associated with the '281 process are largely overcome leading to economic advantages, by providing less expensive reagents, elimination of process steps, and a higher strength nickel solution for treatment in the subsequent nickel recovery process.

Broadly stated the invention is a process for selectively precipitating cobalt from an ammoniacal ammonium sulphate solution containing cobalt (III) hexammine sulphate, comprising adding an effective amount of calcium sulphate to the ammoniacal ammonium sulphate solution to thereby selectively precipitate a cobalt (III) hexammine sulphate-calcium sulphate double salt, separating the solution from the cobalt (III) hexammine sulphate-calcium sulphate double salt precipitate and providing an effective amount of an ammonium carbonate solution to said cobalt (III) hexammine sulphate-calcium sulphate double salt precipitate to thereby redissolve cobalt (III) hexammine sulphate and precipitate calcium carbonate.

In a second broad aspect the invention extends to a process for producing cobalt (III) hexammine sulphate comprising: leaching nickel cobalt sulphides in an ammoniacal ammonium sulphate solution under an elevated pressure of an oxygen-bearing gas and at an elevated temperature with an effective ammonia to metals mole ratio to oxidize nickel and cobalt sulphides to sulphates and to produce an ammoniacal ammonium sulphate leach liquor wherein cobalt is predominantly in the (III) oxidation state and an ammoniacal ammonium sulphate leach residue, separating the ammoniacal ammonium sulphate leach liquor from the ammoniacal ammonium sulphate leach residue, adding an effective amount of calcium sulphate to said ammoniacal ammonium sulphate leach liquor to thereby precipitate a cobalt (III) hexammine sulphate-calcium sulphate double salt, adding an effective amount of ammonium carbonate to said cobalt (III) hexammine sulphate-calcium sulphate double salt to thereby redissolve cobalt (III) hexammine sulphate and precipitate calcium carbonate.

In the operation of the processes of the invention, the cobaltic hexammine sulphate-calcium sulphate double salt precipitation step would be conducted preferably at temperatures ranging above 50° C.

BRIEF DESCRIPTION OF THE DRAWING

The invention will be better understood having reference to the accompanying figure and detailed description wherein.

DESCRIPTION OF THE PREFERRED EMBODIMENT

Figure 1:
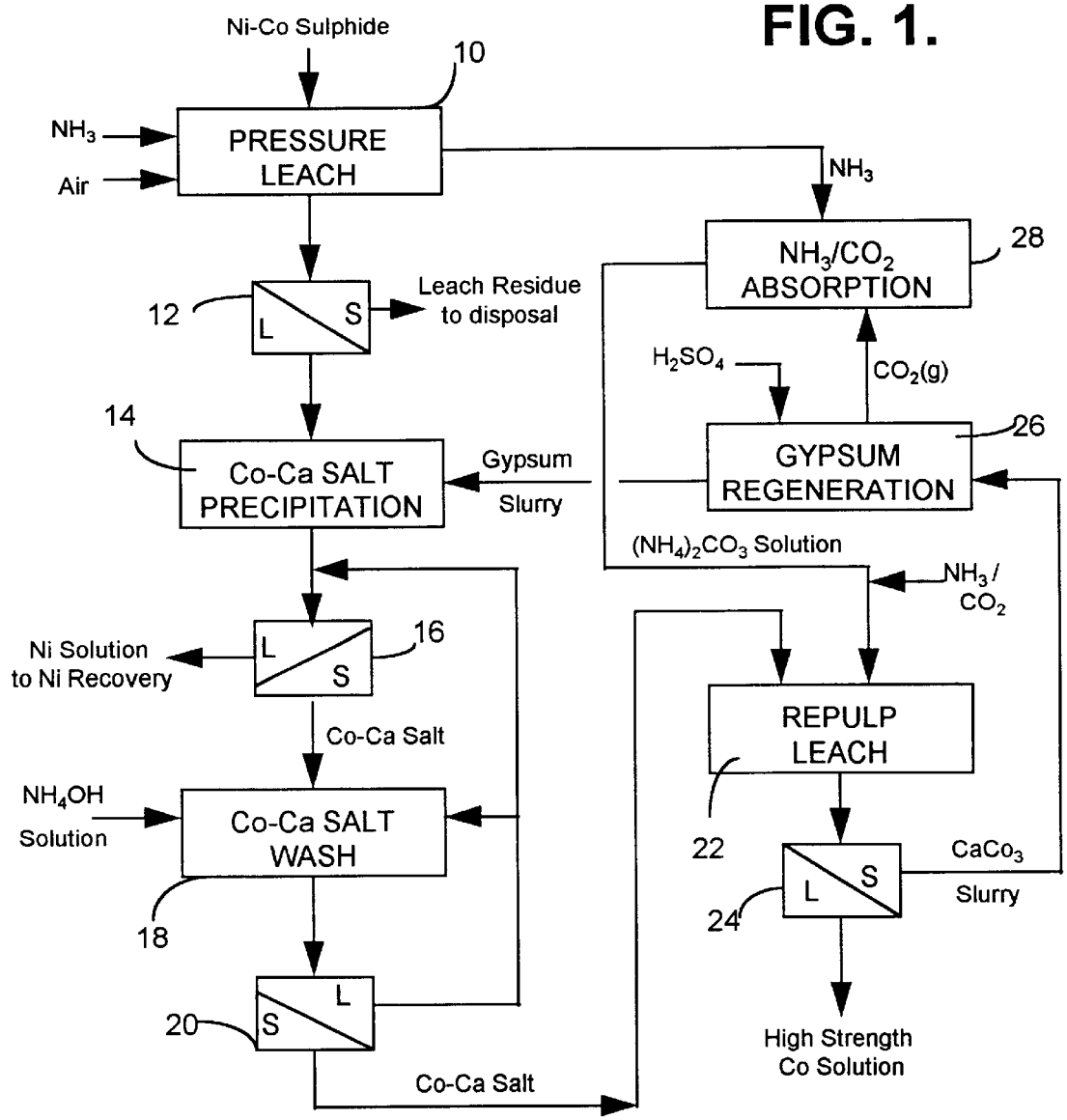
FIG. 1 is a schematic flowsheet of a preferred embodiment of the process.

Whilst the preferred embodiment of the invention is described with respect to mixed nickel-cobalt sulphides, it will be understood by one skilled in the art, that the selective precipitation of cobalt (III) may be extended to any suitable aqueous ammoniacal solution.

leaving reference to the accompanying flowsheet, mixed nickel-cobalt sulphides in a finely divided state are first pressure leached in a conventional ammoniacal ammonium sulphate pressure leach 10, under elevated air pressure of at least 500 kPa, at a temperature of at least 80° C., to oxidize the nickel and cobalt sulphides to the corresponding sulphates. The ammonium sulphate concentration is maintained in the range 150 to 200 g/L and the titratable ammonia concentration is adjusted to maintain the titratable ammonia to divalent metal mole ratio in the range 5:1 to 6.5:1, preferably at about 6:1 to maximize the formation of the hexammine complex ions of nickel (II) and cobalt (III). The leach solution produced will typically contain from 20 to 100 g/L nickel and from 4 to 20 g/l cobalt.

In the liquid-solid separation 12, the product slurry from the ammoniacal ammonium sulphate pressure leach is filtered and the residue consisting predominantly of insoluble iron oxide, is washed with dilute aqueous ammonia solution to remove entrained nickel-bearing solution. To the filtered nickel-cobalt bearing solution from liquid-solid separation step 12, containing cobalt (III) hexammine sulphate is added a slurry of calcium sulphate, preferably gypsum, at a temperature ranging between 50 to 90° C. to precipitate the cobalt (III) hexammine sulphate-calcium sulphate double salt in precipitation step 14.

The slurry from the precipitation step 14 is filtered in liquid-solid separation step 16, to produce a cobalt-depleted nickel solution, containing 20 to 90 g/L nickel and less than 1 g/L cobalt as cobalt (III) hexamine, and a solid cobalt-calcium double salt. The cobalt-depleted solution is passed to a conventional metals recovery circuit (not detailed herein). The cobalt-calcium double salt is washed, in wash step 18, with dilute aqueous ammonia solution (50 to 100 g/L ammonia) to remove entrained nickel solution, with the wash liquor being recycled to the nickel recovery circuit. Following liquid-solid separation in step 20, the solid cobalt-calcium double salt is subjected to an ammonium carbonate repulp leach, step 22, with the resultant nickel-free cobalt enriched leach liquor from liquid-solid separation step 24 being passed to a purification circuit (not shown). The solid calcium carbonate from separation step 24 is subjected to an acidification, in step 26, with the formed carbon dioxide being passed through an ammonia scrub 28 to produce ammonium carbonate solution which is recycled to the ammonium carbonate repulp leach 22 and the regenerated calcium sulphate is recycled to the cobalt-calcium precipitation step 14.

The process of the invention is further illustrated with reference to the following non-limitative examples.

EXAMPLE 1

1 L batches of filtered solution from the ammoniacal leaching of mixed sulphides were heated to 50° C. in a reactor with agitation. Gypsum was added as a fine powder in the quantities shown in Table 1 herebelow, and the resultant slurries were then stirred for a further 20 minutes. The slurries were then filtered and the solids rinsed with 100 g/L ainmonia solution and dried prior to analysis. The results are depicted in Table 1 below.

TABLE 1

| Filtrate Analysis g/L | 0 g/L | 1 g/L | 3 g/L | 5 g/L | 7 g/L | 9 g/L | 11 g/L |
|---|---|---|---|---|---|---|---|
| | Calcium Addition (as $CaSO_4.2H_2O$) | | | | | | |
| Co | 9.4 | 7.7 | 4.9 | 3.2 | 3.1 | 3.1 | 3.2 |
| Co as Co-hex | 6.7 | 5.0 | 2.2 | 0.7 | 0.6 | 0.7 | 0.7 |
| Ca | 0.12 | 0.21 | 0.38 | 1.01 | 0.88 | 0.78 | 0.92 |
| Ni | 73.2 | 72.0 | 73.4 | 72.3 | 72.2 | 71.1 | 73.1 |
| Cu | 1.06 | 1.04 | 1.14 | 1.03 | 1.03 | 1.01 | 1.04 |
| Zn | 2.2 | 2.1 | 2.2 | 2.1 | 2.1 | 2.1 | 2.1 |
| $NH_3f$ | 127 | 123 | 121 | 122 | 120 | 117 | 115 |
| | Solids Analysis, % | | | | | | |
| Co | — | 12.5 | 12.6 | 12.1 | 10.5 | 9.2 | 8.6 |
| Ca | — | 7.7 | 7.9 | 8.1 | 10.3 | 12.4 | 14.2 |

This example illustrates that the precipitation of cobalt hexammine is dependent upon the quantity of calcium present. The solubility of calcium in the leach solution of approximately 1 g/L defines the lower limit to the cobalt separation. Only the cobalt present as cobaltic hexammine sulphate will precipitate with the calcium sulphate. In this example, 89% of the cobalt, which is present as cobaltic hexammine, precipitates upon addition of 5 g/L calcium (as gypsum). Additional calcium in excess of the stoichiometric demand has no further effect upon the final solution composition.

EXAMPLE 2

These tests illustrate the dependence of calcium sulphate reactivity upon reaction temperature. Ammoniacal leach solution similar to that of example 1 was filtered and then heated to the desired reaction temperature. To this solution was added gypsum, to provide an equivalent of 6 g/L calcium, and the slurry was agitated at temperature for another 30 minutes. The slurry was then filtered and the solids rinsed with 100 g/L ammonia solution and dried prior to analysis. From these results it is evident that for the efficient precipitation ofthe cobalt hexammine from leach liquors, reaction temperatures in excess of 50° C. are required. The results are given in table II herebelow.

TABLE II

| Filtrate Analysis g/L | Head | 40 | 50 | 60 | 70 | 80 |
|---|---|---|---|---|---|---|
| | | Reaction Temperature, ° C. | | | | |
| Co | 10.4 | 10.3 | 6.7 | 4.8 | 4.8 | 4.8 |
| Co as Co-hex | 7.2 | 7.4 | 3.5 | 1.5 | 1.3 | 1.3 |
| Ni | 78.6 | 78.9 | 78.8 | 82.6 | 89.4 | 92.8 |
| Cu | 1.18 | 1.18 | 1.29 | 1.35 | 1.46 | 1.40 |
| Zn | 2.9 | 2.9 | 3.1 | 3.3 | 3.6 | 3.4 |
| | | Solids analysis, % | | | | |
| Co | — | 0.45 | 9.6 | 11.4 | 11.7 | 11.4 |
| Ni | — | <0.07 | <0.07 | <0.07 | <0.07 | <0.07 |
| Ca | — | 25.5 | 12.3 | 9.5 | 9.3 | 9.3 |

EXAMPLE 3

The following test illustrates the recovery of cobalt from precipitated calcium salt during a solids repulp procedure. The ammonia washed cobalt-calcium salt was repulped in 100 g/L ammonium carbonate solution at 70° C. The slurry was stirred at temperature for 5 minutes, filtered, and the collected solids after water washing were dried and analyzed.

The results are given in Table IIIa herebelow.

TABLE IIIa

| Element | Feed Solids, % | Washed Residue, % | Repulp Solution, g/L |
|---|---|---|---|
| Co | 11.7 | <0.07 | 8.1 |
| Ca | 9.3 | 37.5 | 0.48 |
| Ni | <0.07 | <0.03 | 0.04 |

The solubility of the cobalt-calcium double salt was measured in water and ammonium sulphate solution and the results are provided below in Tables III(b) and IIIc respectively.

TABLE III(b)

Solubility of Cobalt-Calcium Double Salt in Water

| Temperature, °C. | Co in Solution, g/L | Ca in Solution, g/L |
|---|---|---|
| 25 | 0.43 | 0.21 |
| 50 | 0.45 | 0.22 |
| 75 | 0.37 | 0.17 |

TABLE IIIc

Solubility of Cobalt-Calcium Double Salt in 150 g/L Ammonium Sulphate Solution

| Temperature, °C. | Co in Solution, g/L | Ca in Solution, g/L |
|---|---|---|
| 25 | 1.07 | 0.76 |
| 50 | 1.09 | 0.78 |
| 75 | 1.18 | 0.64 |

It will be understood that other embodiments of the invention will be readily apparent to a person skilled in the art, the scope of the invention being defined in the appended claims.

I claim:

1. A process for selectively precipitating cobalt from an ammoniacal ammonium sulphate solution containing cobalt (III) hexammine sulphate, comprising adding an effective amount of calcium sulphate to the ammoniacal ammonium sulphate solution to selectively precipitate a cobalt (III) hex mine sulphate-calcium sulphate double salt, separating the solution frro the cobalt (III) hexammine sulphate-calcium sulphate double salt precipitate and providing an effective amount of an ammonium carbonate in solution to said cobalt (III) hexammine sulphate-calcium sulphate double salt precipitate to dissolve cobalt (III) hexammine sulphate and precipitate calcium carbonate.

2. The process as set forth in claim 1, precipitating the cobalt (III) hexammine sulphate-calcium sulphate double salt at a temperature above 50° C.

3. The process as set forth in claim 2 wherein an effective amount of calcium sulphate having a 1:1 to 2:1 molar ratio of calcium sulphate to cobalt (III) hexanimine sulphate is provided.

4. The process as set forth in claim 2 wherein said ammonium carbonate is provided in a concentration ranging between 10 to 100 g/L.

5. The process as set forth in claim 1 wherein an effective amount of calcium sulphate having a molar ratio of 1:1 to 2:1 calcium sulpliate to cobalt (III) hexammine sulphate is present, and said ammonium carbonate is provided in a concentration ranging between 10 to 100 g/L.

6. The process as set forth in claim 2 wherein an effective amount of calcium sulphate having a 1:1 to 2:1 molar ratio of calcium sulphate to cobalt (III) hexammine sulphate, and said ammonium carbonate is provided in a concentration ranging between 10 and 100 g/L.

7. A process for producing cobalt (III) hexammine sulphate comprising:

leaching nickel and cobalt sulphides in an ammoniacal ammonium sulphate solution under an elevated pressure of an oxygen-bearing gas and at an elevated temperature with an effective ammonia to metals mole ratio to oxidize nickel and cobalt sulphides to sulphates and to produce an ammoniacal ammonium sulphate leach liquor wherein cobalt is predominantly in the (III) oxidation state and an ammoniacal ammonium sulphate leach residue, separating the ammoniacal ammonium sulphate leach liquor from the ammoniacal ammonium sulphate leach residue, adding an effective amount of calcium as calcium sulphate to said ammoniacal ammonium sulphate leach liquor to precipitate a cobalt (III) hexammine sulphate-calcium sulphate double salt, adding an effective amount of ammonium carbonate to said cobalt (III) hexammine sulphate-calcium sulphate double salt to dissolve cobalt (III) hexammine sulphate and precipitate calcium carbonate and recovering cobalt (III) hexammine sulplate from solution.

8. The process as set forth in claim 7 precipitating the cobalt (III) hexammine sulphate-calcium sulphate double salt at a temperature between 50° C. and 90° C.

9. The process as set forth in claim 7 wherein said calcium is added as calcium sulphate in a range of between 5 to 15 g/L.

10. The process as set forth in claim 8 wherein said calcium is added as calcium sulphate in a range of between 5 to 15 g/L.

11. The process as set forth in claim 7 wherein said ammonium carbonate is added in a concentration in a range of between 10 to 100 g/L.

12. The process as set forth in claim 8 wherein said ammonium carbonate is added in a concentration in a range of between 10 g/L to 100 g/L.

13. The process as set forth in claim 7 wherein said calcium is added as calcium sulphate in a range of between 5 and 15 g/L, and said ammonium carbonate is added in a concentration in a range of between 10 and 100 g/L.

14. The process as set forth in claim 8 wherein said calcium is added as calcium sulphate in a range of between 5 and 15 g/L, and said ammonium carbonate is added in a concentration in a range of between 10 and 100 g/L.

15. The process as set forth in claim 8 further comprising washing the cobalt (III) hexammine sulphate-calcium sulphate double salt precipitate from the precipitation stage with an effective amount of aqueous ammonia solution to remove entrained nickel therefrom.

16. The process as set forth in claim 14 further comprising washing the cobalt (III) hexammine sulphate-calcium sulphate double salt precipitate from the precipitation stage with an effective amount of aqueous ammonia solution to remove entrained nickel therefrom.

17. The process as set forth in claim 7 further comprising acidifying the precipitated calcium carbonate with an effective amount of sulphuric acid to regenerate said calcium sulphate and recycling said calcium sulphate to the ammoniacal ammonium sulphate leach liquor.

18. The process as set forth in claim 7 further comprising acidifying the precipitated calcium carbonate with an effective amount of sulphuric acid to regenerate said calcium sulphate and recycling said calcium sulphate to the ammoniacal ammonium sulphate leach liquor.

19. The process as set forth in claim 8 further comprising acidifying the precipitated calcium carbonate with an effective amount of sulphuric acid to regenerate said calcium sulphate and recycling said calcium sulphate to the ammoniacal ammonium sulphate leach liquor.

20. The process as set forth in claim 15 further comprising acidifying the precipitated calcium carbonate with an effective amount of sulphuric acid to regenerate said calcium sulphate and recycling said calcium sulphate to the ammoniacal ammonium sulphate leach liquor.

* * * * *